US012120143B2

(12) United States Patent
Lewis

(10) Patent No.: US 12,120,143 B2
(45) Date of Patent: *Oct. 15, 2024

(54) MONITORING AND PREVENTING REMOTE USER AUTOMATED CYBER ATTACKS

(71) Applicant: Bank of America Corporation, Charlotte, NC (US)

(72) Inventor: Patrick Lewis, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,763

(22) Filed: May 16, 2023

(65) Prior Publication Data

US 2023/0291761 A1 Sep. 14, 2023

Related U.S. Application Data

(63) Continuation of application No. 16/988,863, filed on Aug. 10, 2020, now Pat. No. 11,722,510.

(51) Int. Cl.
*H04L 9/40* (2022.01)
*G06F 9/455* (2018.01)
(Continued)

(52) U.S. Cl.
CPC ...... *H04L 63/1433* (2013.01); *G06F 9/45558* (2013.01); *G06F 18/214* (2023.01);
(Continued)

(58) Field of Classification Search
None
See application file for complete search history.

(56) References Cited

U.S. PATENT DOCUMENTS 8,516,596 B2 8/2013 Sandoval et al.
8,832,794 B2 9/2014 Aronson
(Continued)

OTHER PUBLICATIONS

Torsten George., "Remote Access: The Hidden Weak Spot for Cyberattacks," Oct. 3, 2018, pp. 1-8, https://www.securityweek.com/remote-access-hidden-weak-spot-cyberattacks.

(Continued)

*Primary Examiner* — Joseph P Hirl
*Assistant Examiner* — Hassan Saadoun
(74) *Attorney, Agent, or Firm* — Banner & Witcoff, Ltd.

(57) ABSTRACT

Aspects of the disclosure relate to monitoring virtual desktops accessed by devices at remote locations using machine-learning models to mitigate potential cyber-attacks. In some embodiments, a computing platform may monitor data associated with a series of activities from a virtual desktop accessed by a remote computing device. Subsequently, the computing platform may detect new activity data on the virtual desktop accessed by the remote computing device, and evaluate the new activity data relative to the data associated with the series of activities, wherein evaluating includes applying a machine learning model to the new activity data. Based on evaluating the new activity data, the computing platform may determine if the new activity data is indicative of a potential cyber-attack. In response to determining that the new activity data is indicative of a potential cyber-attack, the computing platform may initiate one or more security response actions.

19 Claims, 10 Drawing Sheets

(51) Int. Cl.
  *G06F 18/214* (2023.01)
  *G06N 20/00* (2019.01)

(52) U.S. Cl.
  CPC ......... *G06N 20/00* (2019.01); *H04L 63/1416* (2013.01); *H04L 63/1441* (2013.01); *H04L 63/20* (2013.01); *G06F 2009/45587* (2013.01); *G06F 2009/45595* (2013.01)

(56) References Cited

U.S. PATENT DOCUMENTS

| | | | |
|---|---|---|---|
| 9,245,116 B2 | 1/2016 | Evans et al. | |
| 9,565,204 B2 | 2/2017 | Chesla | |
| 9,660,996 B2 | 5/2017 | Aronson | |
| 9,699,209 B2 | 7/2017 | Ng et al. | |
| 10,033,747 B1* | 7/2018 | Paithane | G06F 21/566 |
| 10,083,439 B2 | 9/2018 | Turgeman et al. | |
| 10,218,736 B2 | 2/2019 | Ng et al. | |
| 10,375,169 B1* | 8/2019 | Diallo | G06F 11/301 |
| 10,491,624 B2 | 11/2019 | Ng et al. | |
| 11,429,713 B1* | 8/2022 | Donovan | H04L 63/1433 |
| 2015/0128246 A1* | 5/2015 | Feghali | H04L 63/0209 726/13 |
| 2016/0307191 A1* | 10/2016 | Turgeman | G06F 21/316 |
| 2018/0139219 A1 | 5/2018 | Sabata et al. | |
| 2018/0255077 A1 | 9/2018 | Paine | |
| 2020/0159624 A1* | 5/2020 | Malkov | G06N 20/00 |
| 2020/0329066 A1* | 10/2020 | Kirti | H04L 41/28 |
| 2021/0182403 A1* | 6/2021 | Shackleton | G06F 9/45558 |
| 2021/0182404 A1* | 6/2021 | Shackleton | G06F 9/45558 |

OTHER PUBLICATIONS

Jan. 19, 2023—(US) Non-Final Office Action—U.S. Appl. No. 16/988,863.

Mar. 16, 2023 (US) Notice of Allowance U.S. Appl. No. 16/988,863.

* cited by examiner

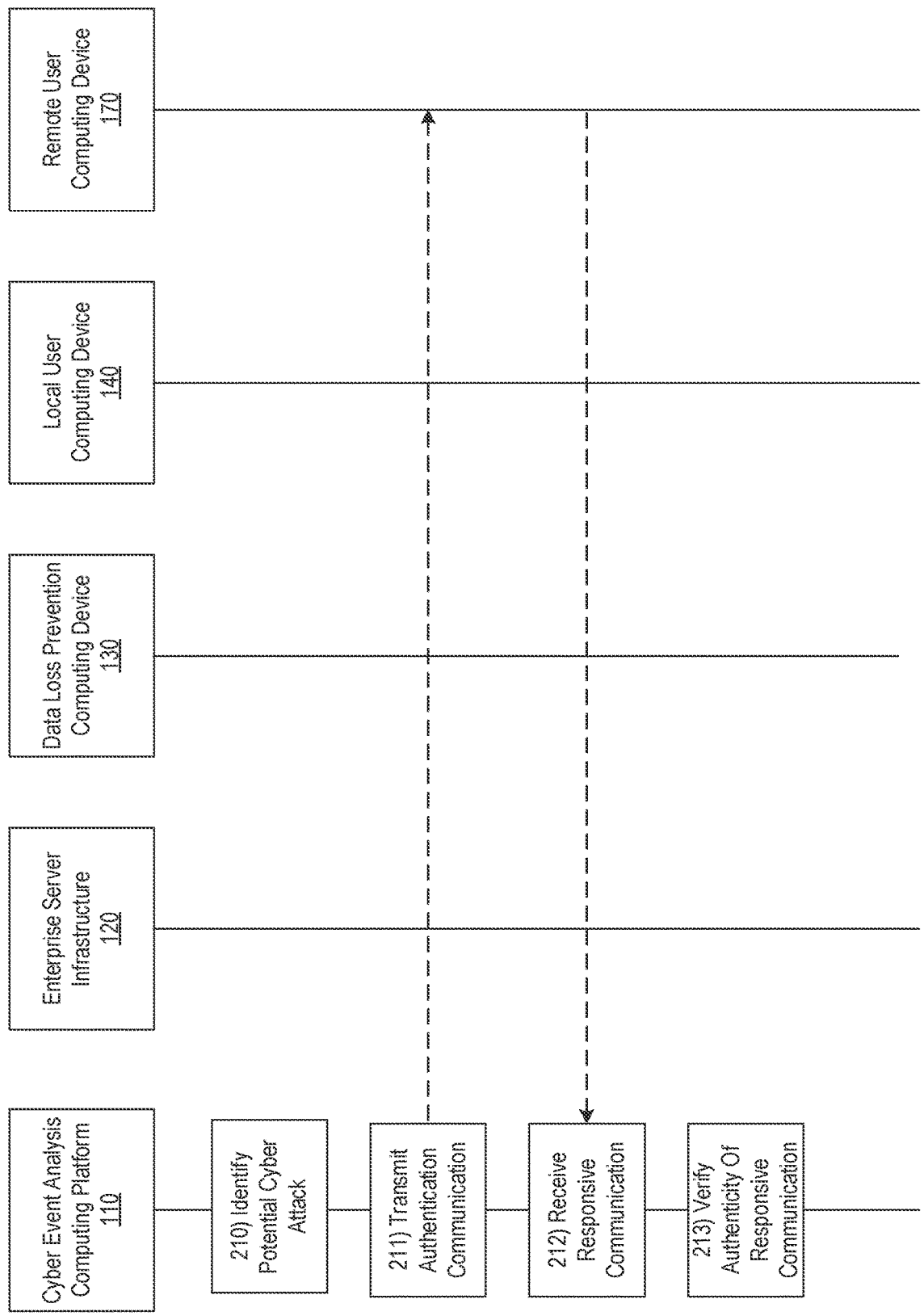

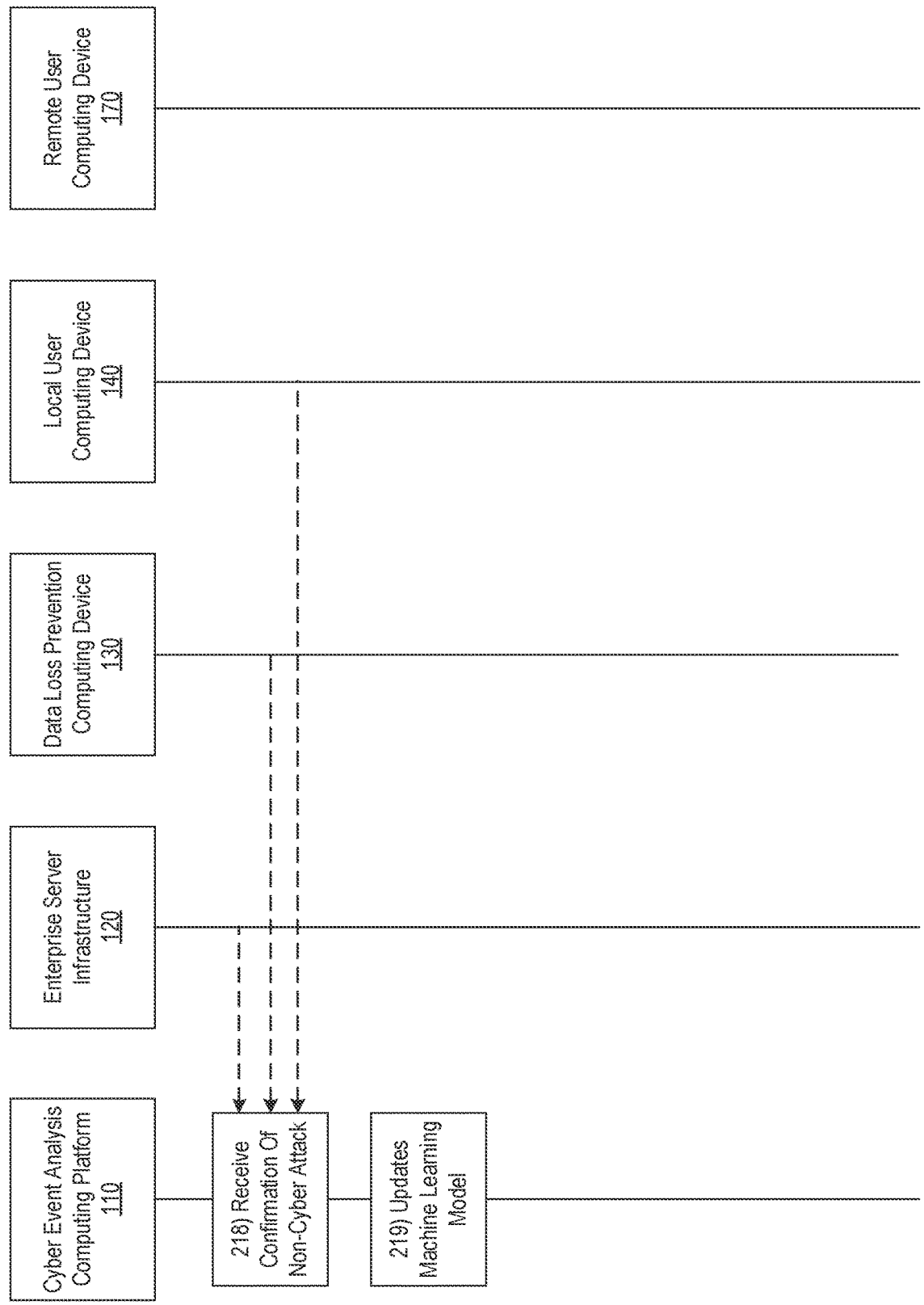

MONITORING AND PREVENTING REMOTE USER AUTOMATED CYBER ATTACKS

CROSS-REFERENCE TO RELATED APPLICATIONS

This application claims the benefit of and is a continuation of U.S. patent application Ser. No. 16/988,863, filed Aug. 10, 2020, and entitled "Monitoring and Preventing Remote User Automated Cyber Attacks," which is incorporated by reference herein in its entirety.

BACKGROUND

Aspects of the disclosure relate to ensuring information security and preventing unauthorized access to secure information systems and/or enterprise resources. In particular, one or more aspects of the disclosure relate to monitoring virtual desktops accessed by devices at remote locations using machine-learning models to evaluate cyber events for potential threats, execute controls to reduce impact of potential threats, and protect enterprise-managed information and resources.

Cyber events, including cyber security threats, are important concerns for corporations and other entities. Enterprise organizations are often trying to find ways to identify threats as quickly as possible and take action to mitigate any impact of a threat. Enterprise organizations may utilize various computing infrastructure to maintain confidential information and/or other sensitive data, identify cyber security threats, and undertake steps to prevent and/or mitigate the impact of cyber threat activities. Such identifying and mitigating may need to be performed in a dynamic manner and may need to be tailored to individual assessments. In some instances, the identifying and mitigating may include handling confidential information and/or other sensitive data that is created, transmitted, and/or used for various purposes. Ensuring that anticipated cyber security threats are identified in advance, and timely and targeted remediation measures are taken to bolster cyber defense and minimize an impact to enterprise services, may be highly advantageous to prevention of actual cyber security threats. In many instances, however, it may be difficult to identify cyber security threats, identify susceptibility of enterprise users to such threats, and undertake steps to prevent and/or mitigate the impact of cyber threat activities with speed and accuracy while also attempting to optimize network resources, bandwidth utilization, and efficient operations of the computing infrastructure involved in performing such cyber defense activities.

Additionally, a new cyber-attack vector has opened with the ever-growing use of remote machines and personal devices, e.g., by enterprise employees, to access enterprise information. For example, malware could be placed on a remote user's personal device to capture confidential information from a virtual desktop accessed by the user's personal device. Accordingly, it would be advantageous to identify cyber threat activities at virtual desktops and undertake steps to prevent and/or mitigate the impact of such threats.

SUMMARY

Aspects of the disclosure provide effective, efficient, scalable, and convenient technical solutions that address and overcome the technical problems associated with ensuring information security and preventing unauthorized access by monitoring devices at enterprise locations using machine-learning models to protect enterprise-managed information and resources.

In accordance with one or more embodiments, a computing platform having at least one processor, a communication interface, and memory may monitor data associated with a series of activities from a virtual desktop accessed by a remote computing device. Subsequently, the computing platform may detect new activity data on the virtual desktop accessed by the remote computing device. The computing platform may then evaluate the new activity data relative to the data associated with the series of activities, wherein evaluating includes applying a machine learning model to the new activity data. Based on evaluating the new activity data relative to the data associated with the series of activities, the computing platform may determine if the new activity data is indicative of a potential cyber-attack. In response to determining that the new activity data is indicative of a potential cyber-attack, the computing platform may initiate one or more security response actions.

In some embodiments, the memory may store additional computer-readable instructions that, when executed by the at least one processor, cause the computing platform to train the machine learning model to the data associated with the series of activities to establish one or more factors for an anomalous virtual desktop accessed by the remote computing device, wherein an anomalous session is associated with a potential cyber-attack.

In some embodiments, the memory may store additional computer-readable instructions that, when executed by the at least one processor, cause the computing platform to update the machine learning model with the new activity data in response to determining that the new activity data is not indicative of a potential cyber-attack.

In some embodiments, training the machine learning model to the data associated with the series of activities to establish the one or more factors for the anomalous virtual desktop accessed by the remote computing device comprises training the machine learning model to the data associated with the series of activities to establish a type of content viewed as a factor of the one or more fact, a number of times content is viewed as a factor of the one or more factors, or a repetition of actions as a factor of the one or more factors. In some embodiments, training the machine learning model to the data associated with the series of activities to establish the one or more factors for the anomalous virtual desktop accessed by the remote computing device comprises training the machine learning model to the data associated with the series of activities to establish a timing of the new activity data on the virtual desktop accessed by the remote computing device as a factor of the one or more factors, a sensitivity of content being viewed as a factor of the one or more factors, or a pattern of actions associated with the new activity data on the virtual desktop accessed by the remote computing device as a factor of the one or more factors. In some embodiments, training the machine learning model to the data associated with the series of activities to establish the one or more factors for the anomalous virtual desktop accessed by the remote computing device comprises training the machine learning model to the data associated with the series of activities to establish a change from creating content to viewing content as a factor of the one or more factors. In some embodiments, training the machine learning model to the data associated with the series of activities to establish the one or more factors for the anomalous virtual desktop accessed by the remote computing device comprises training the machine learning model to the data associated with the series of activities to establish one or more user account settings as a factor of the one or more factors.

In some embodiments, detecting the new activity data may include detecting an idle state at the remote computing device prior to detecting the new activity data and after receiving the data associated with the series of activities.

In some embodiments, the memory may store additional computer-readable instructions that, when executed by the at least one processor, cause the computing platform to monitor data associated with a series of local activities at a local computing device from a user account associated with the virtual desktop. The machine learning model may then be trained based on the data associated with the series of activities and the new activity data relative to the data associated with the series of local activities.

In some embodiments, initiating the one or more security response actions may include transmitting a security response alert to a data loss prevention computing device. The security response alert may then include one or more components of information associated with the new activity data and one or more components of information relating to an indication of a potential cyber-attack.

In some embodiments, initiating the one or more security response actions may include transmitting an authentication communication to the remote computing device, and receiving a responsive authentication from the remote computing device.

In some embodiments, initiating the one or more security response actions may include transmitting a security response alert to a data loss prevention computing device. Transmitting the security response alert may then cause a screen mirroring session of the remote computing device to initiate at a display of the data loss prevention computing device.

In some embodiments, the memory stores additional computer-readable instructions that, when executed by the at least one processor, cause the computing platform to receive a confirmation that the new activity is indicative of a suspicious activity and, responsive to receiving the confirmation, terminate a connection at the remote computing device to a private network.

In accordance with one or more embodiments, a method is provided at a computing platform comprising at least one processor, a communication interface, and memory. The method may include monitoring, by the at least one processor, data associated with a series of activities from a virtual desktop accessed by a remote computing device, detecting, by the at least one processor, new activity data on the virtual desktop accessed by the remote computing device, evaluating, by the at least one processor, the new activity data relative to the data associated with the series of activities, wherein evaluating includes applying a machine learning model to the new activity data, determining, by the at least one processor, if the new activity data is indicative of a potential cyber-attack based on evaluating the new activity relative to the series of activities, and initiating, by the at least one processor, one or more security response actions in response to determining that the new activity data is indicative of a potential cyber-attack.

In some embodiments, the method may further include training the machine learning model to the data associated with the series of activities to establish one or more factors for an anomalous remote session of the remote user account at the remote computing device, wherein an anomalous session is associated with a potential cyber-attack.

In some embodiments, the method may further include monitoring data associated with a series of local activities at a local computing device from a user account associated with the virtual desktop, wherein the machine learning model is trained based on the data associated with the series of activities and the new activity data relative to the data associated with the series of local activities.

In some embodiments, initiating the one or more security response actions may include transmitting a security response alert to a data loss prevention computing device.

In some embodiments, detecting the new activity data may include detecting an idle state at the remote computing device prior to detecting the new activity data and after receiving the data associated with the series of activities.

In accordance with one or more embodiments, one or more non-transitory computer-readable media may be provided storing instructions that, when executed by a computing platform comprising at least one processor, a communication interface, and memory cause the computing platform to monitor data associated with a series of activities from a remote user account at a remote computing device, detect new activity data from the remote user account at the remote computing device, evaluate the new activity data relative to the data associated with the series of activities, determine if the new activity data is indicative of a potential cyber-attack based on evaluating the new activity relative to the series of activities, and in response to determining that the new activity data is indicative of a potential cyber-attack, initiate one or more security response actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for monitoring virtual desktops accessed by devices at remote locations using machine-learning models to mitigate potential cyber-attacks in accordance with one or more example embodiments;

DETAILED DESCRIPTION

Figure 1A:
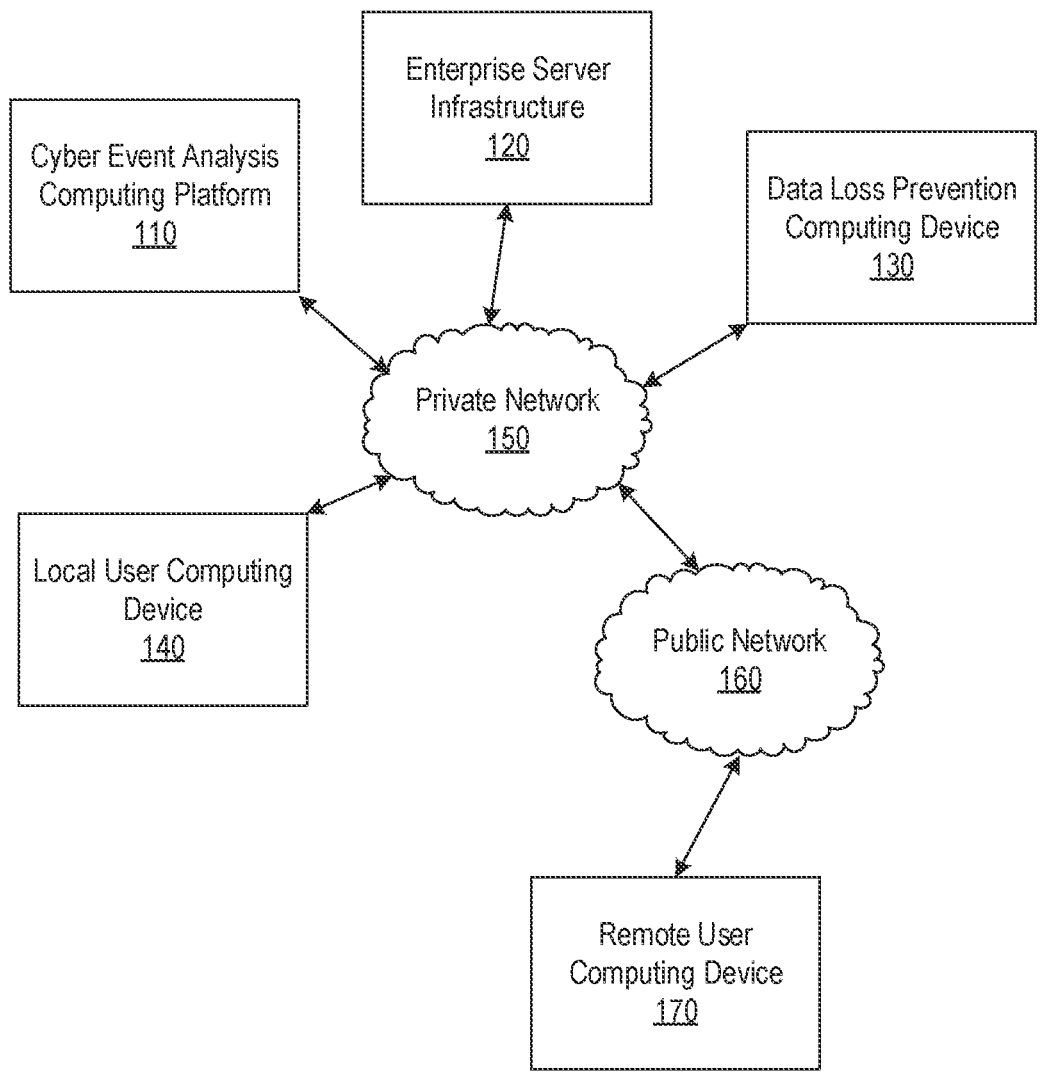
FIGS. 1A and 1B depict an illustrative computing environment for monitoring virtual desktops accessed by devices at remote locations using machine-learning models to mitigate potential cyber-attacks in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to analyzing and mitigating cyber events, such as cyber threats, cyber-attacks, and the like. In some examples, machine learning may be used to evaluate factors associated with an anomalous and/or a non-anomalous session at a virtual desktop, and dynamically detect a potential cyber-attack and initiate one or more security response actions.

As mentioned above, cyber threats are an important concern for corporate and other entities. Often cyber events occur without any prior knowledge by the entity. By the time the entity has been made aware of the cyber event, it may be too late to prevent impact by the cyber event. Additionally, a new cyber threat vector has opened with the growing use of remote machines and personal devices for enterprise users (e.g., employees) to access enterprise data. For example, a cyber-threat actor could place malware on a user's remote computing device to capture the user's screen, mouse actions, keyboard motions, and the like. Optical character recognition (OCR) could then be used to trace confidential information for potential malicious use, such as social security number, Internet Protocol (IP) addresses, credit card numbers, address information, and the like. Further, such a potential cyber-threat actor could learn (e.g., through a learning algorithm) when a user is no longer present at the remote computing device, and then replay the same steps the user previously performed in order to view information of interest and obtain such information without the knowledge of the user.

This type of activity may also operate to automate and repeat certain tasks that were initially performed by a human (e.g., data entry, organization, ledger validation, system replication, and the like). In that regard, user actions may be recorded, and henceforth automated using computer visions. The user actions may be recorded while using OCR to track the data displayed on the user's screen. The user's actions may then be replayed to retrieve the information of interest and/or to automate certain tasks.

Accordingly, aspects described herein relate to a system for monitoring virtual desktops accessed by devices at remote locations using machine-learning models to monitor and mitigate potential cyber-attacks. In some examples, activity data from a virtual desktop accessed by the remote computing device and/or one or more various data in text format (e.g., white papers, input from a user, and the like) may be used to identify one or more factors for an anomalous (or non-anomalous) virtual desktop session accessed by the remote computing device. Upon detecting a potential cyber-threat based on the one or more factors, one or more security response actions may be initiated.

Figure 1B:
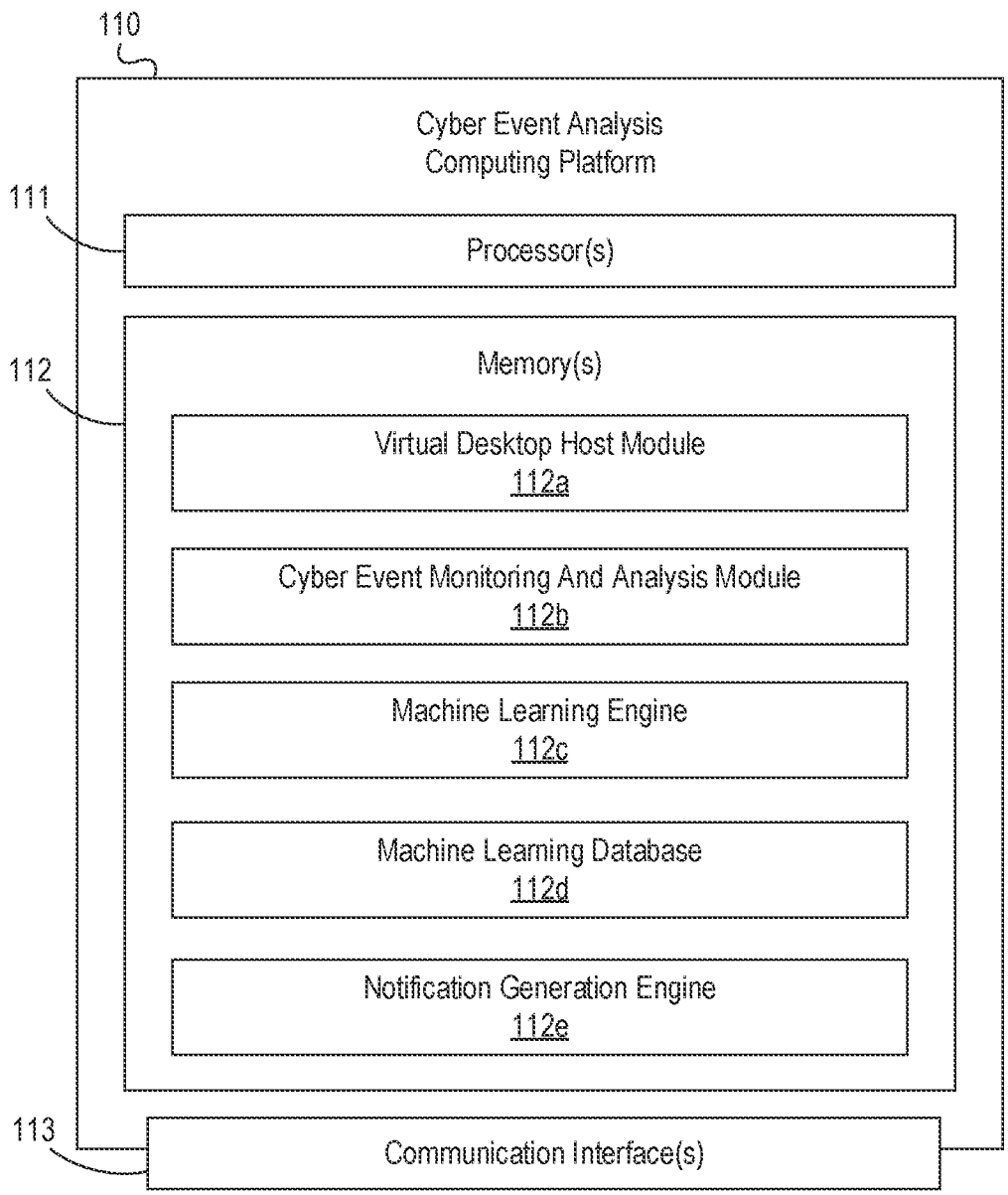

FIGS. 1A and 1B depict an illustrative computing environment for monitoring virtual desktops accessed by devices at remote locations using machine-learning models to mitigate potential cyber-attacks in accordance with one or more example embodiments. Referring to FIG. 1A, computing environment 100 may include one or more computer systems. For example, computing environment 100 may include a cyber event analysis computing platform 110, an enterprise server infrastructure 120, a data loss prevention computing device 130, a local user computing device 140, and a remote user computing device 170. Computing environment 100 also may include one or more computing platforms. For example, and as noted above, computing environment 100 may include cyber event analysis a computing platform 110.

As described herein, a cyber-attack, or potential cyber-attack may be any activity with malicious intent that emanates from the cyber space. For example, some enterprise organizations, such as financial institutions, are frequently targeted by hackers attempting to misappropriate confidential information related to customers. Financial institutions may manage information related to thousands of customers, and such malicious activity might pose a significant risk to customer data. Moreover, as enterprise applications are added, and hostile actors become more sophisticated, the potential for cyber threat activity increases significantly.

As illustrated in greater detail below, computing environment 100 also may include one or more networks, which may interconnect one or more of cyber event analysis computing platform 110, enterprise server infrastructure 120, data loss prevention computing device 130, local user computing device 140, and/or remote user computing device 170. For example, computing environment 100 may include a private network 150 (which may, e.g., interconnect cyber event analysis computing platform 110, enterprise server infrastructure 120, data loss prevention computing device 130, local user computing device 140, and/or one or more other systems which may be associated with an enterprise organization, such as a financial institution, with one or more other systems, public networks, sub-networks, and/or the like). Computing environment 100 may include a public network 160 (which may connect, e.g., remote user computing device 170 to private network 150).

Cyber event analysis computing platform 110 may include one or more computing devices configured to perform one or more of the functions described herein. For example, cyber event analysis computing platform 110 may include one or more computers (e.g., laptop computers, desktop computers, servers, server blades, or the like). Cyber event analysis computing platform 110 may be configured to host and/or execute a machine learning engine to provide dynamic cyber event analysis and control functions. In some examples, data related to a plurality of virtual desktop sessions may be received from one or more sources. In some examples, the received data may be received from a plurality of different computing devices, systems, or the like.

The cyber event analysis computing platform 110 may analyze the data associated with virtual desktop sessions and may parse one or more factors from the data to identify an anomalous virtual desktop session. The cyber event analysis computing platform 110 may apply a machine learning model to identify factors associated with an anomalous (and/or non-anomalous virtual desktop session). For instance, factors such as types of actions, files accessed, timing of a virtual desktop session, and the like may be identified. These identified factor may then be used to identify a potential cyber-attack. Additionally or alternatively, the identified factors may be identified based on a machine learning model.

Enterprise server infrastructure 120 may include one or more computing devices and/or other computer components (e.g., processors, memories, communication interfaces). In addition, and as illustrated in greater detail below, enterprise server infrastructure 120 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise server infrastructure 120 may be deployed.

Enterprise server infrastructure 120 may include one or more computing devices and/or other computer components (e.g., processors, memories, communication interfaces). In addition, enterprise server infrastructure 120 may be configured to host, execute, and/or otherwise provide one or more enterprise applications. For example, enterprise server infrastructure 120 may be configured to host, execute, and/or otherwise provide an enterprise mobile application for user devices, and/or other programs associated with an enterprise server. In some instances, enterprise server infrastructure 120 may be configured to provide various enterprise and/or back-office computing functions for an enterprise organization, such as a financial institution. For example, enterprise server infrastructure 120 may include various servers and/or databases that store and/or otherwise maintain account information, such as financial account information including account balances, transaction history, account owner information, and/or other information. In addition, enterprise server infrastructure 120 may process and/or otherwise execute tasks on specific accounts based on commands and/or other information received from other computer systems included in computing environment 100. Additionally, or alternatively, enterprise server infrastructure 120 may receive instructions from cyber event analysis computing platform 110 and execute the instructions in a timely manner. Additionally, or alternatively, enterprise server infrastructure 120 may receive cyber threat intelligence information from data loss prevention computing device 130 and analyze the information in a timely manner. Also, for example, enterprise server infrastructure 120 may identify one or more threats to the infrastructure emanating from an external cyber threat source, and adopt measures to counter the one or more threats in a timely manner.

Data loss prevention computing device 130 may include one or more computing devices and/or other computer components (e.g., processors, memories, communication interfaces). In addition, and as illustrated in greater detail below, data loss prevention computing device 130 may be configured to receive information from, send information to, and/or otherwise exchange information with one or more devices that are physically present at and/or within a certain range of the enterprise location at which enterprise server infrastructure 120 may be deployed. The enterprise location (e.g., where enterprise server infrastructure 120 is deployed) may be remote from and/or different from a location where the cyber event analysis computing platform 110 is deployed.

Data loss prevention computing device 130 may be a desktop computing device (e.g., desktop computer, terminal), or the like or a mobile computing device (e.g., smartphone, tablet, smart watch, laptop computer, or the like). In addition, data loss prevention computing device 130 may be linked to and/or used by one or more enterprise users (who may, e.g., be employees of an enterprise organization operating the enterprise center where data loss prevention computing device 130 is deployed and/or used). For instance, data loss prevention computing device 130 may be deployed at an enterprise center, such as the enterprise center where enterprise server infrastructure 120 is deployed, so that data loss prevention computing device 130 may be used by one or more employees of an enterprise organization operating the enterprise center when such employees are facilitating cyber security efforts. For example, data loss prevention computing device 130 may store and/or execute one or more enterprise applications, such as user account management applications, user history applications, account security applications, virtual screen sharing applications, and/or other applications, which may be used by the one or more enterprise users of data loss prevention computing device 130.

Local user computing device 140 may include one or more computing devices and/or other computer components (e.g., processors, memories, communication interfaces). In addition, and as illustrated in greater detail below, local user computing device 140 may be configured to receive information from, send information to, and/or otherwise exchange information with one or more devices that are physically present at and/or within a certain range of the enterprise location at which enterprise server infrastructure 120 may be deployed. In some examples, however, the local user computing device 140 may be remote from and/or different from the enterprise location (e.g., where enterprise server infrastructure 120 is deployed).

In some arrangements, cyber event analysis computing platform 110, enterprise server infrastructure 120, data loss prevention computing device 130, and/or local user computing device 140 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because virtual desktops that are able to able confidential information, e.g., related to the enterprise organization, may be prone to certain kinds of cyber-attacks. Machine learning of user activity during virtual desktop sessions (e.g., by cyber event analysis computing platform 110) may be used to identify potentially suspicious activity and initiate one or more security response actions upon identifying suspicious activity.

Remote user computing device 170 may be a mobile computing device (e.g., smartphone, tablet, smart watch, laptop computer, or the like) or desktop computing device (e.g., desktop computer, terminal, or the like. In addition, remote user computing device 170 may be linked to and/or used by a first user (who may be, e.g., an employee or other individual affiliated with an enterprise organization and who may have authorized access to certain potentially confidential information of the enterprise organization). Remote user computing device 170 may be equipped with certain software to enable a virtual desktop environment. A virtual desktop may provide an emulation of a particular computer system, such as an enterprise computer system located at with the enterprise server infrastructure. A virtual desktop infrastructure (also referred to as "VDI") is realized by, for example, VMware Horizon View, Citrix XenDesktop, and Windows Server ("VMware" is a registered trademark of VMware Inc. in the United States, other countries, or both; "Xen" is a registered trademark of Citrix Systems, Inc. in the United States, other countries, or both; and "Windows" is a registered trademark of Microsoft Corporation in the United States, other countries, or both). While the following description refers to VMware vSphere, VMware vCenter and VMware Horizon View, in particular, the implementations described herein enables distributed computing clusters using any distributed computing platform and any virtualization platform.

Local user computing device 140 and remote user computing device 170 may be configured to communicate with and/or connect to one or more computing devices or systems shown in FIG. 1A. For instance, local user computing device 140 may communicate with one or more computing systems or devices via private network 150, while remote user computing device 170 may communicate with one or more computing systems or devices via public network 160. In some examples, local user computing device 140 may be used to control or implement aspects of the functions performed by cyber event analysis computing platform 110, to monitor activity on the remote user computing device 170, initiate one or more security response actions, and the like.

The remote user computing device 170 may be used to communicate with, for example, cyber event analysis computing platform 110, to receive and/or transmit authentication passcodes or passwords, to update various virtual desktop setting or preferences, and the like.

In one or more arrangements, local user computing device 140, data loss prevention computing device 130, and/or remote user computing device 170 may be any type of computing device or combination of devices capable of performing the particular functions described herein. For example, local user computing device 140, data loss prevention computing device 130, and/or remote user computing device 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of local user computing device 140, data loss prevention computing device 130, and/or remote user computing device 170 may, in some instances, be special-purpose computing devices configured to perform specific functions.

As mentioned above, computing environment 100 also may include one or more networks, which may interconnect one or more of cyber event analysis computing platform 110, enterprise server infrastructure 120, data loss prevention computing device 130, local user computing device 140, and/or remote user computing device 170. For example, computing environment 100 may include private network 150 and public network 160. Private network 150 and/or public network 160 may include one or more sub-networks (e.g., Local Area Networks (LANs), Wide Area Networks (WANs), or the like). Private network 150 may be associated with a particular organization (e.g., a corporation, financial institution, educational institution, governmental institution, or the like) and may interconnect one or more computing devices associated with the organization. For example, cyber event analysis computing platform 110, enterprise server infrastructure 120, data loss prevention computing device 130, local user computing device 140, and/or remote user computing device 170, may be associated with an organization (e.g., a financial institution), and private network 150 may be associated with and/or operated by the organization, and may include one or more networks (e.g., LANs, WANs, virtual private networks (VPNs), or the like) that interconnect cyber event analysis computing platform 110, enterprise server infrastructure 120, data loss prevention computing device 130, local user computing device 140, and one or more other computing devices and/or computer systems that are used by, operated by, and/or otherwise associated with the organization. Public network 160 may connect private network 150 and/or one or more computing devices connected thereto (e.g., cyber event analysis computing platform 110, enterprise server infrastructure 120, data loss prevention computing device 130, local user computing device 140) with one or more networks and/or computing devices that are not associated with the organization. For example, remote user computing device 170 might not be associated with an organization that operates private network 150 (e.g., remote user computing device 170 may be owned, operated, and/or serviced by one or more entities different from the organization that operates private network 150, such as one or more customers of the organization, public or government entities, and/or vendors of the organization, rather than being owned and/or operated by the organization itself or an employee or affiliate of the organization), and public network 160 may include one or more networks (e.g., the internet) that remote user computing device 170 to private network 190 and/or one or more computing devices connected thereto (e.g., cyber event analysis computing platform 110, enterprise server infrastructure 120, data loss prevention computing device 130, local user computing device 140).

In one or more arrangements, cyber event analysis computing platform 110, data loss prevention computing device 130, local user computing device 140, and/or remote user computing device 170 may be any type of computing device capable of receiving a user interface, receiving input via the user interface, and communicating the received input to one or more other computing devices. For example, cyber event analysis computing platform 110, data loss prevention computing device 130, local user computing device 140, and/or remote user computing device 170, and/or the other systems included in computing environment 100 may, in some instances, include one or more processors, memories, communication interfaces, storage devices, and/or other components. As noted above, and as illustrated in greater detail below, any and/or all of cyber event analysis computing platform 110, data loss prevention computing device 130, local user computing device 140, and/or remote user computing device 170 may, in some instances, be special-purpose computing devices configured to perform specific functions.

Referring to FIG. 1B, cyber event analysis computing platform 110 may include one or more processor(s) 111, memory(s) 112, and communication interface(s) 113. A data bus may interconnect processor 111, memory 112, and communication interface 113. Communication interface 113 may be a network interface configured to support communication between cyber event analysis computing platform 110 and one or more networks (e.g., private network 150 or the like). Memory 112 may include one or more program modules having instructions that when executed by processor 111 cause cyber event analysis computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of cyber event analysis computing platform 110 and/or by different computing devices that may form and/or otherwise make up cyber event analysis computing platform 110. For example, memory 112 may have, store, and/or include a virtual desktop host module 112a, cyber event monitoring and analysis module 112b, a machine learning engine 112c, a machine learning database 112d, and a notification generation 112e.

Virtual desktop host module 112a may have instructions that direct and/or cause cyber event analysis computing platform 110 to allow devices at remote locations to host virtual desktop sessions of one or more devices at the enterprise location, as discussed in greater detail below. Virtual desktop host module 112a may also have instructions that direct and/or cause cyber event analysis computing platform 110 to synchronize enterprise device information (which may, e.g., include device information associated with local devices at various enterprise locations) with various enterprise center monitoring systems (e.g., enterprise server infrastructure 120, data loss prevention computing device 130, local user computing device 140) which may be deployed at various enterprise locations and/or other systems.

Cyber event monitoring and analysis module 112b may have instructions that direct and/or cause cyber event analysis computing platform 110 to monitor activity at a virtual desktop associated with an enterprise server infrastructure 120 and/or local user computing device, and identify a potential cyber threat activity on the virtual desktop, as discussed in greater detail below. In some embodiments, cyber event monitoring and analysis module 112b may have instructions that cause cyber event analysis computing platform 110 to, receive, via the communication interface and from a remote user device (e.g., remote user computing device 170), activity data associated with a virtual desktop session, and to detect a potentially suspicious activity or a potential cyber-attack on a virtual desktop (e.g., using machine learning engine 112c, as described in further detail below). The data may be received from one or more computing systems, devices, applications, or the like. In some examples, the data may be received in text format and may be parsed to identify one or more parameters of activity during the virtual desktop session. For instance, the data may be parsed to identify timing of the session, information accessed during the session, steps taken during the sessions, and the like. In some embodiments, cyber event monitoring and analysis module 112b may have instructions that direct and/or cause cyber event analysis computing platform 110 to send, via the communication interface, one or more security response actions to another device (e.g., data loss prevention computing device 130) associated with a potentially suspicious activity or a potential cyber-attack on a virtual desktop.

In some examples, new activity data may be compared to activity data of previous sessions that were verified as authentic by a user (e.g., an enterprise employee) to identify a potentially suspicious activity or a potential cyber-attack. If there is no indication of a potential cyber-attack in the new activity data, the machine learning model may be updated with the new activity data using machine learning engine 112c and machine learning database 112d, as described in further detail below. If a potential cyber-threat is identified, one or more relevant parameters obtained from the new activity data may be identified for providing with one or more security response actions. For instance, if a potential cyber-attack is identified based on a confidentiality classification of accessed data as part of the virtual desktop session, then that confidentiality classification information may be determined as relevant for information to be provide in a subsequent security alert response.

In some examples, machine learning may be used to aid in analyzing activity data associated with a virtual desktop to identify a potential cyber-attack. Accordingly, cyber event analysis computing platform 110 may further have, store and/or include a machine learning engine 112c and machine learning database 112d. Machine learning engine 112c and machine learning database 112d may store instructions and/or data that cause or enable cyber event analysis computing platform 110 to evaluate analyzed data to determine or identify a potential cyber-attack on the virtual desktop (based on e.g., a pattern of activity at the virtual desktop, a timing of the virtual desktop session relative to previous sessions, type of data accessed, type of activity at the virtual desktop, and the like). The machine learning database 112d may be generated based on analyzed data (e.g., data from previously received data, data from local user computing device 140, and the like), raw data, and/or data received from one or more outside sources.

The machine learning engine 112c may receive data (e.g., data from remote user computing device 170, local user computing device 140, and the like) and, using one or more machine learning algorithms, may generate one or more machine learning datasets for machine learning database 112d. Various machine learning algorithms may be used without departing from the present disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the present disclosure. In some examples, the machine learning engine 112c may analyze data to identify patterns of activity, sequences of activity, and the like, to generate one or more machine learning datasets for machine learning database 112d.

Machine learning database 112d may store information used by machine learning engine 112c and/or cyber event analysis computing platform 110 in monitoring and analyzing virtual desktop sessions of local devices at enterprise locations using machine-learning models to protect enterprise-managed information and resources.

The machine learning database 112d may include machine learning data linking one or more parameters or factors from activity data from a virtual desktop to detection of a potential cyber-attack, likelihood of activity data indicating a potential cyber-attack, and the like. For instance, training data may be used to link one or more known parameters or factor with types of cyber-attacks, amounts or types of impact from a cyber-attack, likelihood of a cyber-attack, and the like. Accordingly, the machine learning database 112d may be used to evaluate new activity data on a virtual desktop accessed by a remote computing device (e.g., remote user computing device 170) to determine a likelihood of a cyber-attack, type of cyber-attack, potential impact, and the like.

The machine learning database 112d may be updated and/or validated based on subsequent data received, for example, after new activity data has been analyzed and evaluated, and upon no potential cyber-attack being detected in the new activity data. In some examples, data associated with one or more activities from a virtual desktop accessed by a remote computing device, remote user information and authorization credentials, and the like, may be stored in a database, such as machine learning database 112d.

Notification generation 112e may have instructions that direct and/or cause cyber event analysis computing platform 110 to send, to another computing device, an alert notification indicating a potential cyber-attack. Notification generation 112e may store instructions and/or data that may cause or enable the cyber event analysis computing platform 110 to dynamically generate and/or execute notifications. For instance, in some examples, new activity data on a virtual desktop accessed by a remote computing device (e.g., remote user computing device 170) may be evaluated in real-time or near real-time. Accordingly, as new activity data is evaluated and a potential cyber-attack may be detected/identified, one or more notification may be dynamically generated and executed in order to protect an entity from a threat associated with the potential cyber-attack. For instance, an entity may maintain a type of information that a particular user has access to, or a role that the user has in using or modifying such information. If the new activity data indicates that such a user's virtual desktop attempted to access or use information in a manner that is unauthorized or atypical of the user, a potential cyber-attack may be detected, and a related notification may be pushed out to certain systems, devices, and the like associated with the enterprise, to prevent or minimize impact of the potential cyber-attack from the identified information.

Figure 2A:
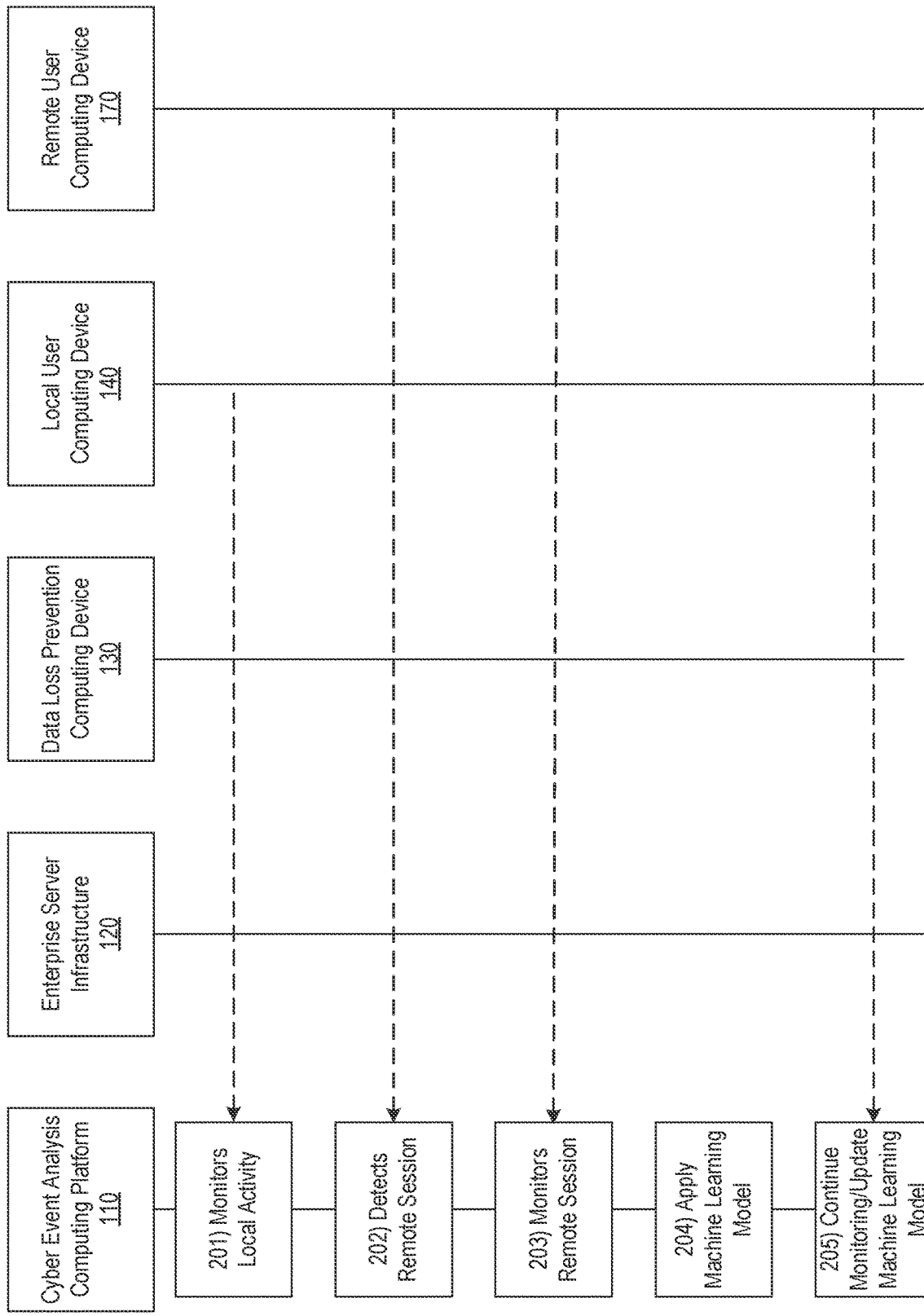

FIGS. 2A-2E depict an illustrative event sequence for monitoring virtual desktops accessed by devices at remote locations using machine-learning models to mitigate potential cyber-attacks in accordance with one or more example embodiments. Referring to FIG. 2A, at step 201, cyber event analysis computing platform 110 initially monitor activity of a particular user at local user computing device 140. Such monitoring may provide an initial snapshot of factors associated with a non-anomalous user session. In some examples, cyber event analysis computing platform 110 may train a machine learning model based on a dataset obtained from monitoring local user activity at step 201. For instance, cyber event analysis computing platform 110 may receive data associated with a series of local activity session at local user computing device 140 to identify factors associated with non-anomalous user sessions (e.g., normal, non-suspicious activity) and/or factors associated with anomalous user sessions (e.g., unusual activity). Such monitoring information may, for instance, indicate specific patterns of normal activity by the user associated with a user enterprise account and may include factors such as a type of content viewed, a number of times content is viewed, a repetition of actions, a timing of a session from the user account, a pattern of actions during a session, a change in user role (e.g., from creating content to viewing content), a sensitivity of content being accessed, a role associated with the user account, and the like. Subsequently, cyber event analysis computing platform 110 may process the local activity (e.g., using a machine learning engine and/or machine learning application programming interface (API)) to create, train, and/or otherwise generate the machine learning model based, at least in part, on the local activity.

At step 202, cyber event analysis computing platform computing platform 110 may detect a remote session at the remote user computing device 170. For example, at step 202, cyber event analysis computing platform 110 may receive, via the communication interface (e.g., communication interface 113), from one or more data source computer systems (e.g., from remote user computing device 170, local user computing device 140. enterprise server infrastructure 120, and/or one or more other data sources), indication of a new virtual desktop session at remote user computing device 170. In some example, the detection of a remote session of step 202 may include determining that a user account associated with the remote session is the same as or affiliated to the user account associate with the local activity at step 201. The detection of a remote session of step 202 may include detection of a log in attempt or login initiation at a device remote from the enterprise organization (e.g., remote user computing device 170).

At step 203, cyber event analysis computing platform 110 may monitor remote activity of the user at a remote user computing device 170. Such monitoring may provide an initial snapshot of factors associated with a non-anomalous remote user session. Additionally or alternatively, such monitoring may, in combination with the monitoring of local user activity at step 201, provide a further refinement of factors associated with a non-anomalous user session. In some examples, cyber event analysis computing platform 110 may train a machine learning model based on a dataset obtained from monitoring remote user activity at step 203 (and/or monitoring local user activity at step 201). For instance, cyber event analysis computing platform 110 may receive data associated with a series of remote activity sessions at remote user computing device 170 to identify factors associated with non-anomalous user sessions (e.g., normal, non-suspicious activity) and/or factors associated with anomalous user sessions (e.g., unusual activity). Such monitoring information may, for instance, indicate specific patterns of normal activity by the user associated with a user enterprise account and may include factors such as a type of content viewed, a number of times content is viewed, a repetition of actions, a timing of a session from the user account, a pattern of actions during a session, a change in user role (e.g., from creating content to viewing content), a sensitivity of content being accessed, a role associated with the user account, and the like. Such factors of a remote session may be considered separately or in combination with similar factors from the local activity monitored at step 201. Subsequently, cyber event analysis computing platform 110 may process the remote session data (e.g., using a machine learning engine and/or machine learning application programming interface (API)) to create, train, and/or otherwise generate the machine learning model based, at least in part, on the remote activity, as described in more detail below.

At step 204, cyber event analysis computing platform 110 may apply a machine learning model to the monitored data. For example, at step 204, cyber event analysis computing platform 110 may train a machine learning classification model to the monitored data received from the remote user computing device 170 (and, in some examples, also from the local user computing device 140. For instance, cyber event analysis computing platform 110 may train the machine learning model to return one or more results indicating whether factors from the monitoring data (e.g., actions taken, content accessed, session timing, or the like) are normal/non-suspicious or unusual/suspicious. In training the machine learning model to the monitored data, cyber event analysis computing platform 110 may compute an indication or an approximate likelihood (e.g., based on a score within the range of 0 to 1, where 0 represents fully normal, non-suspicious activity and 1 represents fully unusual, suspicious activity) for when factors from a remote sessions are indicative of suspicious activity, based on the activity data and corresponding features of the machine learning model.

In some embodiments, training the machine-learning classification model to the monitored data received from the one or more data source computer systems may include applying a machine learning classification model to device identification data received from the enterprise center. For example, in training the machine learning model to the monitored data received from the one or more data source computer systems (e.g., remote user computing device 170, local user computing device 140) at step 204, cyber event analysis computing platform 110 may apply the machine learning model to data received at step 203 (and, in some examples, data received at step 201). For instance, the data received may be used to identify a number of factors associated with the user activity (e.g., actions taken, content accessed, session timing, or the like) for which the machine learning model may be trained to predict a potential cyber-attack.

In some embodiments, training the machine learning model to the monitored data may include training the machine learning model to a non-anomalous pattern of user activity for a typical virtual desktop session accessed by a remote computing device. For example, in training the machine learning model to the monitored data at step 204, cyber event analysis computing platform 110 may train the machine learning model to recognize an anomaly relative to a typical virtual desktop session accessed by the remote user computing device 170 based on a learned pattern of user activity during a virtual desktop sessions. For instance, the cyber event analysis computing platform 110 may learn that a typical virtual desktop session of a particular person occurs in the morning hours and consists and creating files. Accordingly, a virtual desktop sessions that deviates from this pattern (e.g., a session at night consisting on only viewing files) may be indicative of a potential cyber-attack.

In some embodiments, applying the machine learning model to the monitored data received from the one or more data source computer systems may include applying the machine learning model to data received from a virtual desktop session on the remote user computing device 170, where the virtual desktop session accesses information associated with an enterprise organization, and where at least some of the information may be confidential and/or have varying levels of confidentiality. For example, in applying the machine learning model to the monitored data received from the one or more data source computer systems (e.g., remote user computing device 170, local user computing device 140) at step 204, cyber event analysis computing platform 110 may train the machine learning model to associate user accounts with a confidentiality level of information likely to be accessed by that user account, an/or a type of information likely to be accessed by that user account. As such, the machine learning model may be trained to detect anomalous activity based on the user account at the virtual desktop accessing a type of information that differs (e.g., in confidentiality, in classification, and the like) from information that is typically accessed.

After training the machine learning model, at step 205, cyber event analysis computing platform 110 may continue monitoring activity at the remote user computing device 170 and/or update the machine learning model as application. For example, at step 205, cyber event analysis computing platform 110 may repeat steps similar to those taken in steps 203 and 204. For example, as additional data is received as cyber event analysis computing platform 110 continues to monitor remote user computing device 170 and does not detect cyber-attacks, the machine learning model may be updated with that additional data, and thus be accurately tailored to detect a potential cyber-attack on that remote user account. For instance, cyber event analysis computing platform 110 may determine additional factors associated with a non-anomalous virtual desktop session to and thus be able to detect a potential cyber-attack with greater accuracy.

Figure 2B:
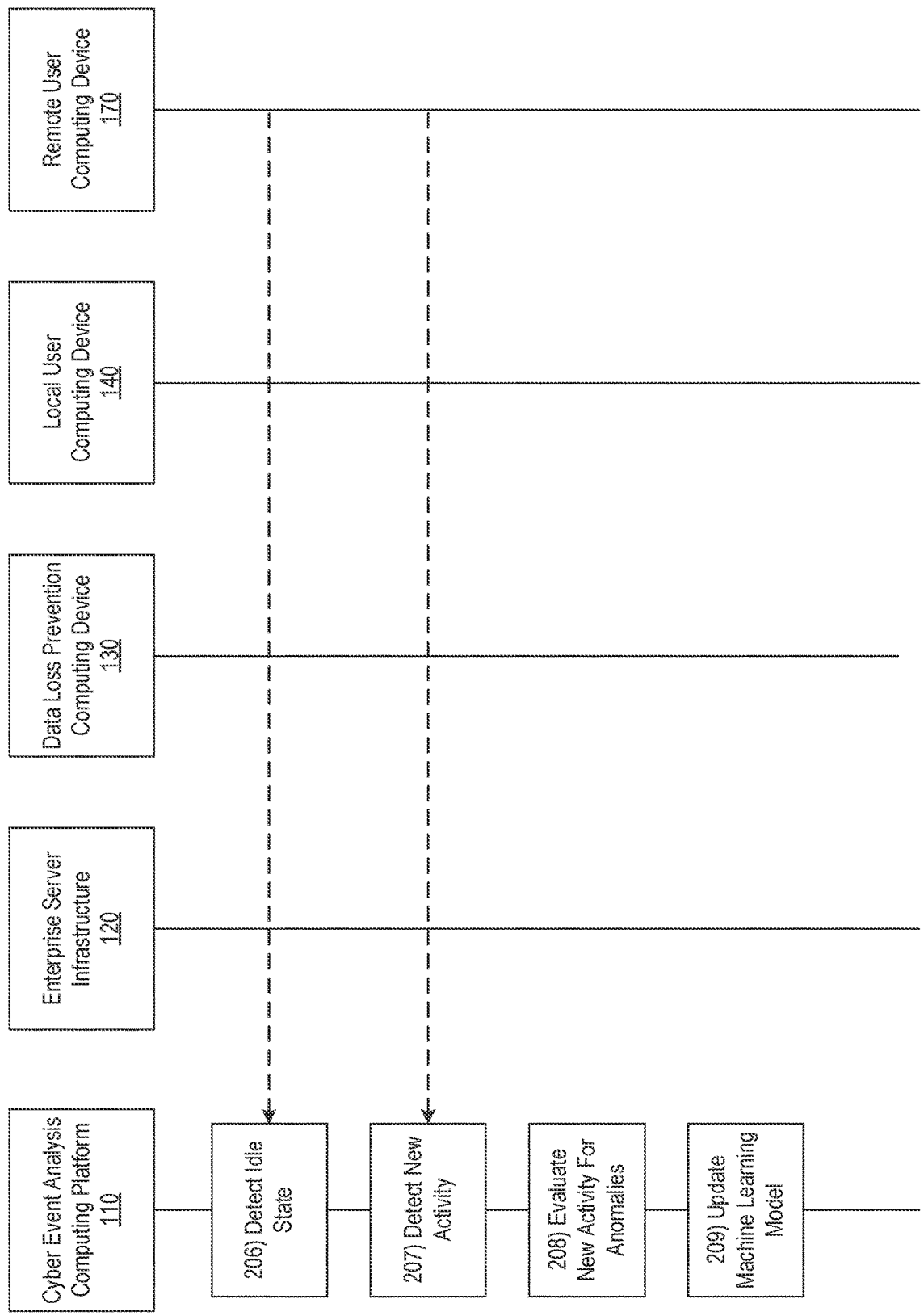

Referring to FIG. 2B, in some embodiments, at step 206, cyber event analysis computing platform 110 detect that remote user computing device 170 has entered an idle state. Such a step may be useful, e.g., to detect that a user has physically left the remote user computing device 170 or that the user has ended or paused the session. Such an occurrence may be indicative of a precursor to a potential cyber-attack, e.g., where a subsequent activity at the virtual desktop on the remote user computing device 170. For example, unusual activity detected subsequent to the detection of an idle state may be more indicative of potentially suspicious behavior than the same behavior in the middle of an active virtual desktop session where surrounding activity fits a non-anomalous pattern of use by the user.

At step 207, cyber event analysis computing platform 110 may detect new activity on the virtual desktop accessed by the remote user computing device 170. For example, at step 207, in detecting an idle state at step 206, cyber event analysis computing platform 110 may initiate monitoring of activity at the remote user computing device 170 after detecting that remote user computing device 170 is no longer in an idle state.

In some embodiments, detecting new activity at step 207 may trigger a new activity monitoring process to capture the activity data from the virtual desktop accessed from the remote user computing device 170. The new activity monitoring session may include capturing one or more component s of information relating to the activity on the virtual desktop. For example, the new activity monitoring session may track information being accessed, timing of the access, actions taken with respect to the information, and the like. Properties associated with the information accessed may also be included, such as a confidentiality of the information, whether the user has previously accessed such information, and the like. The information may also include timing of the virtual desktop session and/or timing since the detection of an idle state at step 206.

At step 208, cyber event analysis computing platform 110 may evaluate the new activity data using the machine learning model to detect anomalies or other occurrences representative of potential cyber-attacks or potentially suspicious activity.

At step 209, if cyber event analysis computing platform 110 determines that the new activity data does not contain anomalies or other occurrences representative of potential cyber-attacks or potentially suspicious activity, cyber event analysis computing platform may update the machine learning model based on the new activity data. Such updating may be similar to the updating described at step 205.

Referring to FIG. 2C, at step 210, based on evaluating the new activity data using the machine learning model, cyber event analysis computing platform 110 may identify a potential cyber-attack or potentially suspicious activity.

At step 211, cyber event analysis computing platform 110 may transmit an authentication communication to remote user computing device 170. The authentication communication may include a request for user login credentials, a user passcode or password, a prompt to answer preset security questions, a challenge-response test to determine whether or not a user at the computing device is human, and the like. The authentication communication may allow cyber event analysis computing platform 110 to verify that the user associated with the user account is indeed at the virtual desktop accessed by the remote user computing device 170, e.g., in circumstances where cyber event analysis computing platform 110 has determined a moderate (but not high) likelihood of a potential cyber-attack or potentially suspicious activity. In some examples, the authentication communication may be transmitted to a remote device associated with the user account (e.g., a mobile device), but not the remote user computing device 170. In such examples, the authentication communication may include additional information relating the identified potential cyber-attack or potentially suspicious activity, such as a related timestamp, a descriptor of information accessed, action(s) taken with respect to the information accessed, and the like.

Figure 3:
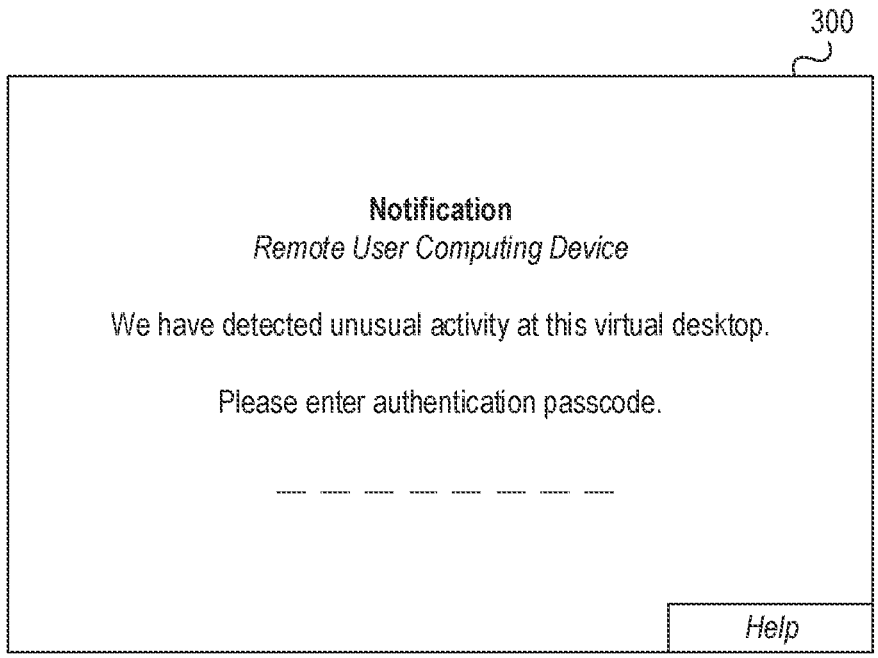
FIGS. 3-5 depict example graphical user interfaces for monitoring virtual desktops accessed by devices at remote locations using machine-learning models to mitigate potential cyber-attacks in accordance with one or more example embodiments.

Additionally or alternatively, in transmitting the authentication communication to the remote user computing device 170, cyber event analysis computing platform 110 may generate and/or send information to the remote user computing device 170 which may cause the remote user computing device 170 to generate, display, and/or otherwise present a graphical user interface similar to graphical user interface 300, which is illustrated in FIG. 3. As seen in FIG. 3, graphical user interface 300 may include text and/or other information indicating that unusual activity has been detected at the virtual desktop accessed by the remote user computing device 170 1 (e.g., "We have detected unusual activity at this virtual desktop.") as well as a prompt to enter an authentication passcode (e.g., "Please enter authentication passcode."). While FIG. 3 depicts a prompt for an authentication passcode, any number of other authentication prompts may be employed without departing from the scope of the present disclosure, e.g., user login credentials, a user password, a personal identification number, a prompt to answer preset security questions, a challenge-response test to determine whether or not a user at the computing device is human, and the like.

In some examples, cyber event analysis computing platform 110 may prompt the remote user computing device 170 to corroborate certain types of activity that cyber event analysis computing platform 110 may have detected as indicative of a potential cyber-attack. For instance, in prompting the remote user computing device 170 to corroborate certain activity, cyber event analysis computing platform 110 may ask the user at the remote user computing device 170 to provide input confirming a normal/non-suspicious label or an unusual/suspicious label associated with the activity and/or a factor associated with the activity.

At step 212, cyber event analysis computing platform 110 may receive a communication responsive to the authentication communication from the remote user computing device 170. Such a responsive communication may include the information that was prompted as part of the authentication communication, such as user login credentials, a user passcode or password, a prompt to answer preset security questions, a challenge-response test to determine whether or not a user at the computing device is human, and the like.

At step 213, cyber event analysis computing platform 110 may verify the authenticity of the responsive communication from the remote user computing device 170. Verifying the authenticity may include comparing the responsive communication to stored user credentials, passwords, passcodes, and the like. Upon verifying the authenticity at step 213, the cyber event analysis computing platform 110 may flag the recent activity as a non-cyber-attack or non-anomalous. In some examples, flagging the recent activity as a non-cyber-attack or non-anomalous may include updating the machine learning model with the recent activity data to better train the machine learning model to virtual desktop session on the user account and more accurately detect a potential cyber-attack. If the authenticity is not verified at step 213, cyber event analysis computing platform 110 may determine that authenticating the remote user computing device 170 has failed, and may initiate one or more additional security response actions. In some examples, the authenticity is not verified at step 213, cyber event analysis computing platform 110 may transmit one or more additional authentication communications to remote user computing device 170. The one or more additional authentication communication may be the same as the initial authentication communication (e.g., requesting the same user credential or password information) or the one or more additional authentication communication may include requests for information that differ from the initial authentication communication. In examples, where no communication responsive to the authentication communication is received or where a delay between transmitting the authentication communication and receiving the responsive communication, cyber event analysis computing platform 110 may determine that authenticating the remote user computing device 170 has failed.

Figure 2D:
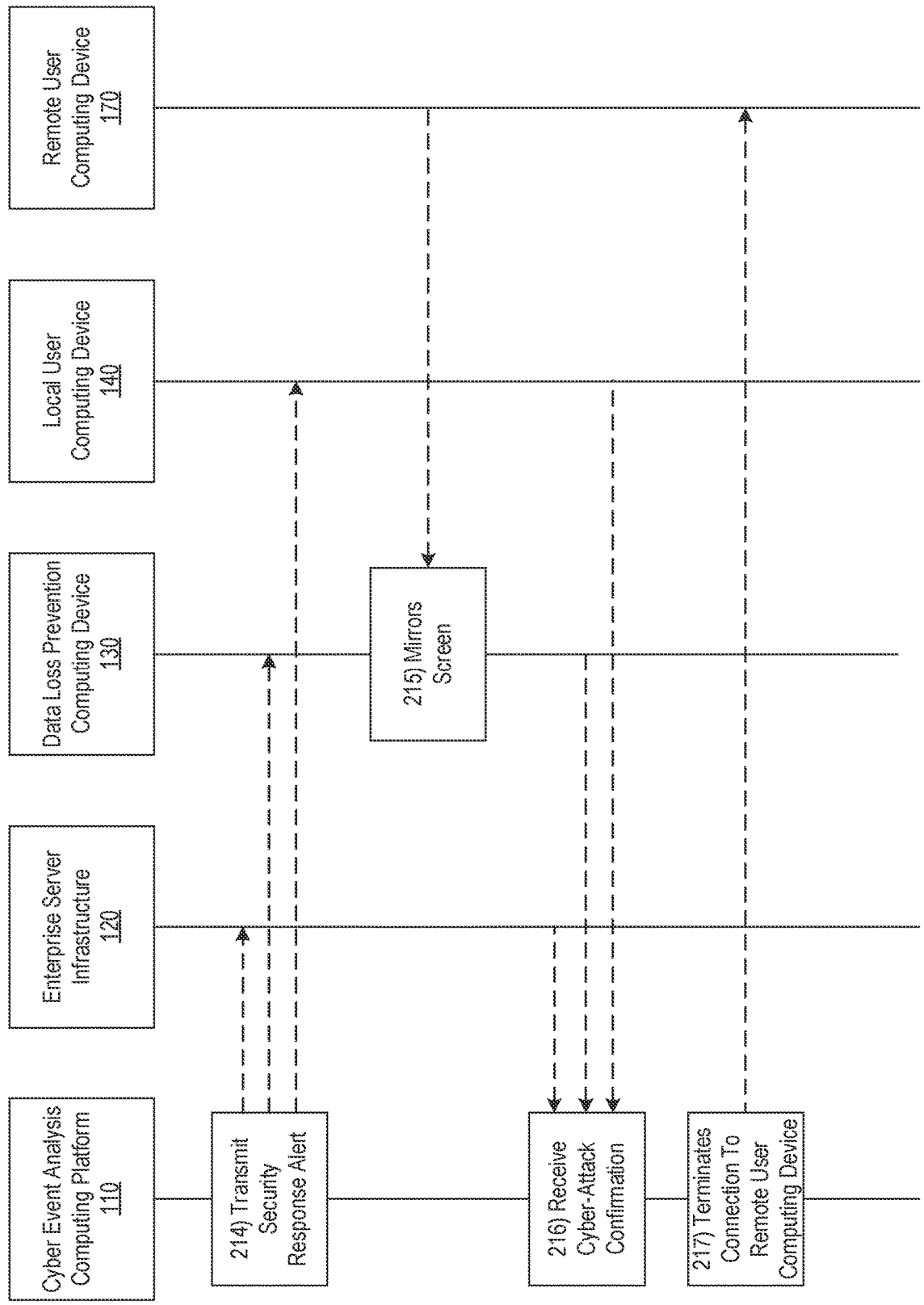

Referring to FIG. 2D, at step 214, cyber event analysis computing platform 110 may transmit a security response alert to one or more other computing devices or systems, such as enterprise server infrastructure 120, data loss prevention computing device 130, local user computing device 140. In some examples, step 214 may occur upon cyber event analysis computing platform 110 determining that authenticating the remote user computing device 170 has failed at step 213. In some examples, cyber event analysis computing platform 110 may proceed from detecting a potential cyber-attack or potentially suspicious behavior at step 208 directly to step 214, e.g., where cyber event analysis computing platform 110 determines high likelihood that the new activity data is indicative of a potential cyber-attack or potentially suspicious behavior. In examples where the security response alert is transmitted to enterprise server infrastructure 120, notification of the detected potential cyber-attack may be provided to additional entities associated with the enterprise organization via the enterprise server infrastructure 120.

In some embodiments, sending the security response alert generated based on the new activity data may include sending the security response alert to the one or more enterprise computer systems in real-time as the activity data is being captured and monitored by the cyber event analysis computing platform 110. For example, in transmitting the security response alert at step 214, cyber event analysis computing platform 110 may send the security response alert generated based on the new activity data to one or more enterprise computer systems (e.g., enterprise server infrastructure 120, data loss prevention computing device 130, local user computing device 140) in real-time as the activity data is being monitored and captured by the cyber event analysis computing platform 110. By sending such alerts in real-time, cyber event analysis computing platform 110 may, for instance, deliver one or more technical benefits over conventional systems, as cyber event analysis computing platform 110 may provide the enterprise computer systems with relevant information in a timely manner (e.g., substantially concurrent with an event occurring at the remote user computing device 170).

As another example, at step 214, cyber event analysis computing platform 110 may generate and transmit one or more client account notifications based on the new activity data. Such client account notifications may, for instance, include information notifying one or more account owners about the potential cyber-attack or malicious activity affecting their account(s). For example, cyber event analysis computing platform 110 may send, via the communication interface (e.g., communication interface 113), to one or more client computing devices (e.g., one or more computing devices linked to one or more clients of the enterprise organization, such as local user computing device 140), the one or more client account notifications generated based on the new activity data. By sending the one or more client account notifications to the one or more client computing devices, cyber event analysis computing platform 110 may, for instance, alert one or more customers of an enterprise organization that their account information and/or other private information may be at risk and/or was subject to an attempt at unauthorized access.

In examples where the security response alert is transmitted to data loss prevention computing device 130, at step 215, the data loss prevention computing device may initiate a screen mirroring session to view the screen and current actions at the virtual desktop accessed by the remote user computing device 170. The screen mirroring session may provide verification as to whether the new activity data is indicative of a potential cyber-attack. The screen mirroring session may also provide verification as to the information being accessed as part of the potential cyber-attack. The screen mirroring session may, in some instances, be used to monitor ongoing activity at the virtual desktop accessed by the remote user computing device 170, e.g., in instances where cyber event analysis computing platform 110 has determined there is a moderate or low likelihood of a potential cyber-attack, and does not yet proceed to further steps based on verifying that the new activity data is indicative of a cyber-attack.

Figure 4:
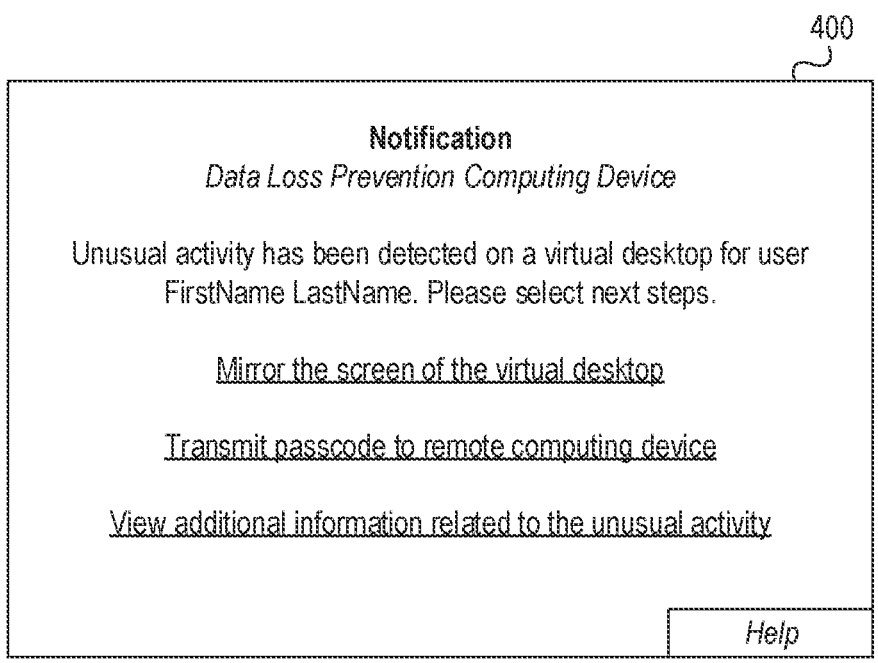

Additionally or alternatively, in transmitting the security response alert to data loss prevention computing device 130, cyber event analysis computing platform 110 may generate and/or send information to data loss prevention computing device 130 which may cause data loss prevention computing device 130 to generate, display, and/or otherwise present a graphical user interface similar to graphical user interface 400, which is illustrated in FIG. 4. As seen in FIG. 4, graphical user interface 400 may include text and/or other information indicating that unusual activity has been detected on the virtual desktop and providing one or more subsequent steps to mitigate the potential cyber-attack (e.g., "Unusual activity has been detected on a virtual desktop for user FirstName LastName. Please select next steps.") as well as one or more user-selectable controls allowing the user of data loss prevention computing device 130 to select a next step (e.g., "Mirror the screen of the virtual desktop"; "Transmit passcode to remote computing device"; "View additional information related to the unusual activity"). The user of data loss prevention computing device 130 may select to view the screen of the user at the remote user computing device 170 (e.g., by selection of "Mirror the screen of the virtual desktop"), and a screen mirror session may be initiating similar to that described at step 215. The user of data loss prevention computing device 130 may select to transmit an authentication communication to the remote user computing device 170 (e.g., by selection of "Transmit passcode to remote computing device"), and an authentication communication may be transmitted to the remote user computing device 170 similar to that described at step 211. The user of data loss prevention computing device 130 may select to view additional information relating to the activity data for which the security response alert was initiated (e.g., by selection of "View additional information related to the unusual activity"), and additional information may subsequently be provided.

Figure 5:
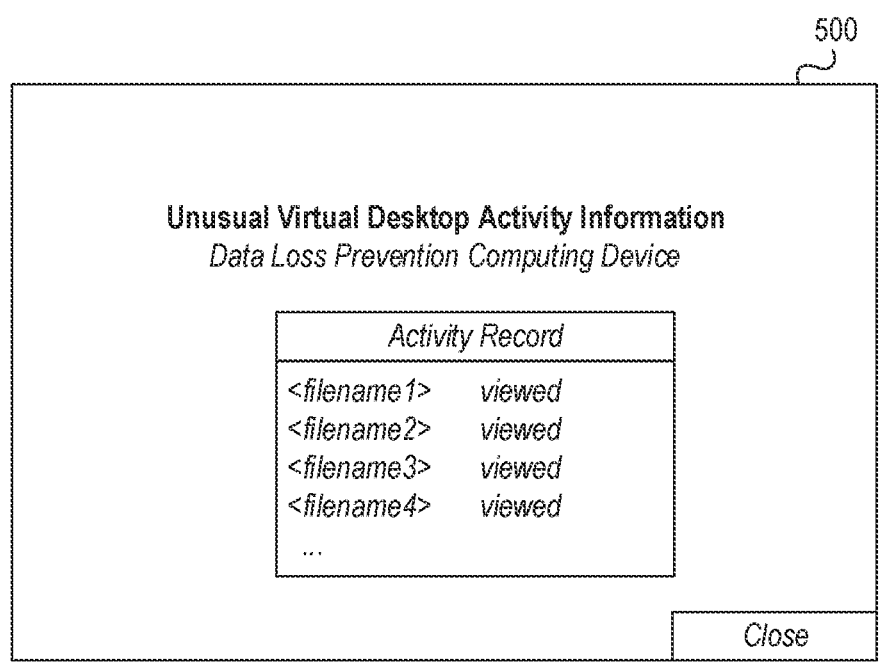

In some examples, in data loss prevention computing device 130 requesting additional information relating to the activity data for which the security response alert was initiated, cyber event analysis computing platform 110 may generate and/or send information to data loss prevention computing device 130 which may cause data loss prevention computing device 130 to generate, display, and/or otherwise present a graphical user interface similar to graphical user interface 500, which is illustrated in FIG. 5. As seen in FIG. 5, graphical user interface 500 may include text and/or other information indicating information associated with the unusual activity detected on the virtual desktop as well as an activity record list providing an indication of information accessed and actions taken with respect to the information accessed (e.g., "Activity Record"). While FIG. 5 depicts a list of file names and actions taken to those files, any number of additional or alternative information components may be provided with graphical user interface 500, e.g., a type of content viewed, a number of times content is viewed, a repetition of actions, a timing of a session from the user account, a pattern of actions during a session, a change in user role (e.g., from creating content to viewing content), a sensitivity of content being accessed, a role associated with the user account, and the like.

While graphical user interface 400 of FIG. 4 and graphical user interface 500 are depicted for display on the data loss prevention computing device 130, similar graphical user interfaces may also be generated, displayed, and/or otherwise presented on other computing devices or systems, such as a computing device of the enterprise server infrastructure 120, local user computing device 140, and the like.

At step 216, cyber event analysis computing platform 110 may receive a confirmation of a cyber-attack one or more other computing devices or systems, such as enterprise server infrastructure 120, data loss prevention computing device 130, local user computing device 140. In some examples, the computing device or system that sends the cyber-attack confirmation at step 216 may be the same computing device or system that received the security response alert at step 214. In some examples, receiving the cyber-attack confirmation at step 216 may occur only where cyber event analysis computing platform 110 has determined there is a moderate or low likelihood of a potential cyber-attack, whereas in examples where cyber event analysis computing platform 110 has determined there is a high likelihood of a potential cyber-attack, cyber event analysis computing platform 110 and/or data loss prevention computing device 130 may proceed to further steps to mitigate data loss or compromise without awaiting a cyber-attack confirmation.

At step 217, cyber event analysis computing platform 110 may terminate a virtual desktop connection to the remote user computing device 170, e.g., where there is a high likelihood that the new activity data is indicative of a cyber-attack or where a cyber-attack confirmation has been received at step 216. In some examples, terminating the virtual desktop connection at step 217 may include temporarily blocking the user from signing in to a new virtual desktop session, e.g., until further account verification steps have been completed. In some examples, the user may be required to unlock the user account from the local user computing device 140. In some examples, the remote user computing device 170 may be required to install one or more cyber security programs as a prerequisite to unlocking the user account. In some examples, termination the connection at step 217 may include providing a cyber-attack notification message on a screen of the remote user computing device.

Referring to FIG. 2E, at step 218 cyber event analysis computing platform 110 may receive a confirmation of that the new activity data does not indicate cyber-attack. The confirmation may be received from one or more other computing devices or systems, such as enterprise server infrastructure 120, data loss prevention computing device 130, local user computing device 140, or remote user computing device 170. In some examples, the computing device or system that sends the non-cyber-attack confirmation at step 218 may be the same computing device or system that received the security response alert at step 214.

In some examples, receiving the non-cyber-attack confirmation at step 218 may occur only where cyber event analysis computing platform 110 has determined there is a moderate or low likelihood of a potential cyber-attack, whereas in examples where cyber event analysis computing platform 110 has determined there is a high likelihood of a potential cyber-attack, cyber event analysis computing platform 110 and/or data loss prevention computing device 130 may proceed to further steps to mitigate data loss or compromise without awaiting a cyber-attack confirmation.

At step 219, upon verifying that the new activity data does not indicate a cyber-attack, cyber event analysis computing platform 110 may update the machine learning model based on the new activity data. Such updating may be similar to the updating described at steps 205 and 209. For example, cyber event analysis computing platform 110 may retrain and/or otherwise update the machine learning model based on verified information and/or data received from remote user computing device 170, data loss prevention computing device 130, and/or one or more other sources (e.g., confirming and/or rejecting one or more potential cyber-attack detections made by the machine learning model, including the evaluation made at step 208 as to whether the new activity data is indicative of a potential cyber-attack or whether the new activity data may be classified as normal/non-suspicious or unusual/suspicious.

Subsequently, cyber event analysis computing platform 110 may repeat one or more steps of the example event sequence discussed above in evaluating monitored activity data from a virtual desktop accessed by the remote user computing device 170, using the machine learning model. Additionally or alternatively, cyber event analysis computing platform 110 may initiate one or more activity monitoring processes and/or generate and send one or more security response alerts, similar to how cyber event analysis computing platform 110 may initiate such processes and generate and send such alerts in the examples described above.

Figure 6:
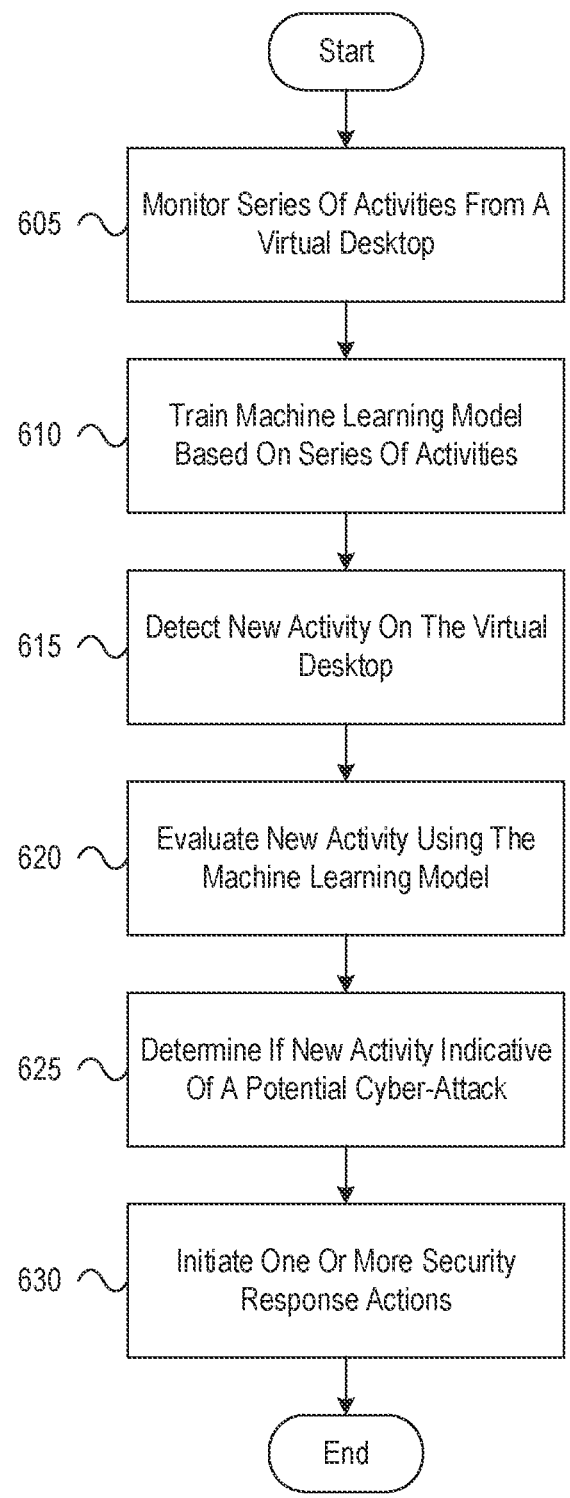
FIG. 6 depicts an illustrative method for monitoring virtual desktops accessed by devices at remote locations using machine-learning models to mitigate potential cyber-attacks in accordance with one or more example embodiments.

FIG. 6 depicts an illustrative method for monitoring virtual desktops accessed by devices at remote locations using machine-learning models to mitigate potential cyber-attacks in accordance with one or more example embodiments. Referring to FIG. 6, at step 605, a computing platform having at least one processor, a communication interface, and memory may monitor data associated with a series of activities from a virtual desktop accessed by a remote computing device. At step 610, the computing platform may train a machine learning model to the data associated with the series of activities to establish one or more factors for an anomalous remote session (or a non-anomalous remote session) of the virtual desktop accessed by the remote computing device. In some example, an anomalous session may be associated with a potential cyber-attack. At step 615, the computing platform may detect new activity data on the virtual desktop accessed by the remote computing device. At step 620, in response to detecting new activity data on the virtual desktop accessed by the remote computing device, the computing platform may evaluate the new activity data relative to the data associated with the series of activities, where evaluating includes applying the machine learning model to the new activity data. At step 625, the computing platform may determine if the new activity data is indicative of a potential cyber-attack based on evaluating the new activity relative to the data associated with the series of activities. At step 630, the computing platform may initiate one or more security response actions in response to determining that the new activity data is indicative of a potential cyber-attack.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
detect new activity data on a virtual desktop accessed by a remote computing device, wherein detecting the new activity data includes detecting an idle state at the remote computing device prior to detecting the new activity data and after receiving data associated with a series of activities authorized by the remote computing device accessing the virtual desktop;
evaluate the new activity data relative to data associated with the series of activities authorized by the remote computing device accessing the virtual desktop, wherein evaluating includes applying a machine learning model to the new activity data to identify a change in a content access categorization;
determine if the new activity data is indicative of a potential cyber-attack based on evaluating the new activity data relative to the data associated with the series of activities and identifying the change in the content access categorization; and
in response to determining that the new activity data is indicative of the potential cyber-attack, initiate one or more security response actions.

2. The computing platform of claim 1, wherein the memory stores additional computer-readable instructions that, when executed by the at least one processor, cause the computing platform to:
monitor data associated with the series of activities from the virtual desktop accessed by the remote computing device; and
train the machine learning model to monitored data associated with the series of activities from the virtual desktop accessed by the remote computing device to establish one or more factors for an anomalous virtual desktop accessed by the remote computing device, wherein an anomalous session is associated with a potential cyber-attack.

3. The computing platform of claim 2, wherein the memory stores additional computer-readable instructions that, when executed by the at least one processor, cause the computing platform to:
in response to determining that the new activity data is not indicative of a potential cyber-attack, update the machine learning model with the new activity data.

4. The computing platform of claim 2, wherein training the machine learning model to the monitored data associated with the series of activities to establish the one or more factors for the anomalous virtual desktop accessed by the remote computing device comprises training the machine learning model to the monitored data associated with the series of activities to establish a type of content viewed as a factor of the one or more factors, a number of times content is viewed as a factor of the one or more factors, or a repetition of actions as a factor of the one or more factors.

5. The computing platform of claim 2, wherein training the machine learning model to the monitored data associated with the series of activities to establish the one or more factors for the anomalous virtual desktop accessed by the remote computing device comprises training the machine learning model to the monitored data associated with the series of activities to establish a timing of the new activity data on the virtual desktop accessed by the remote computing device as a factor of the one or more factors, a sensitivity of content being viewed as a factor of the one or more factors, or a pattern of actions associated with the new activity data on the virtual desktop accessed by the remote computing device as a factor of the one or more factors.

6. The computing platform of claim 2, wherein training the machine learning model to the monitored data associated with the series of activities to establish the one or more factors for the anomalous virtual desktop accessed by the remote computing device comprises training the machine learning model to the monitored data associated with the series of activities to establish a change from creating content to viewing content as a factor of the one or more factors.

7. The computing platform of claim 2, wherein training the machine learning model to the monitored data associated with the series of activities to establish the one or more factors for the anomalous virtual desktop accessed by the remote computing device comprises training the machine learning model to the monitored data associated with the series of activities to establish one or more user account settings as a factor of the one or more factors.

8. The computing platform of claim 2, wherein the memory stores additional computer-readable instructions that, when executed by the at least one processor, cause the computing platform to:
monitor data associated with a series of local activities at a local computing device from a user account associated with the virtual desktop,
wherein the machine learning model is trained based on the data associated with the series of activities and the new activity data relative to the data associated with the series of local activities.

9. The computing platform of claim 1, wherein initiating the one or more security response actions includes transmitting a security response alert to a data loss prevention computing device.

10. The computing platform of claim 9, wherein the security response alert includes one or more components of information associated with the new activity data and one or more components of information relating to an indication of a potential cyber-attack.

11. The computing platform of claim 1, wherein initiating the one or more security response actions includes transmitting an authentication communication to the remote computing device, and receiving a responsive authentication from the remote computing device.

12. The computing platform of claim 1, wherein initiating the one or more security response actions includes transmitting a security response alert to a data loss prevention computing device, and wherein transmitting the security response alert causes a screen mirroring session of the remote computing device to initiate at a display of the data loss prevention computing device.

13. The computing platform of claim 1, wherein the memory stores additional computer-readable instructions that, when executed by the at least one processor, cause the computing platform to:
receive a confirmation that the new activity data is indicative of a suspicious activity; and responsive to receiving the confirmation, terminate a connection at the remote computing device to a private network.

14. A method, comprising:
at a computing platform comprising at least one processor, a communication interface, and memory:
  detecting, by the at least one processor, new activity data on a virtual desktop accessed by a remote computing device;
  evaluating, by the at least one processor, the new activity data relative to data associated with a series of activities authorized by the remote computing device accessing the virtual desktop, wherein evaluating includes applying a machine learning model to the new activity data to identify a change in a type of content accessed or a change in access type at the virtual desktop;
  determining, by the at least one processor, if the new activity data is indicative of a potential cyber-attack based on evaluating the new activity data relative to the data associated with the series of activities; and
  in response to determining that the new activity data is indicative of the potential cyber-attack, initiating, by the at least one processor, one or more security response actions,
  wherein initiating the one or more security response actions includes transmitting a security response alert to a data loss prevention computing device, and wherein transmitting the security response alert causes a screen mirroring session of the remote computing device to initiate at a display of the data loss prevention computing device.

15. The method of claim 14, further comprising:
monitoring data associated with the series of activities from the virtual desktop accessed by the remote computing device; and
training the machine learning model to the monitored data associated with the series of activities from the virtual desktop accessed by the remote computing device to establish one or more factors for an anomalous remote session of the virtual desktop accessed by the remote computing device, wherein an anomalous session is associated with a potential cyber-attack.

16. The method of claim 15, further comprising:
monitoring data associated with a series of local activities at a local computing device from a user account associated with the virtual desktop,
wherein the machine learning model is trained based on the data associated with the series of activities and the new activity data relative to the data associated with the series of local activities.

17. The method of claim 14, wherein initiating the one or more security response actions includes transmitting a security response alert to a data loss prevention computing device.

18. The method of claim 14, wherein detecting the new activity data includes detecting an idle state at the remote computing device prior to detecting the new activity data and after receiving the data associated with the series of activities.

19. One or more non-transitory computer-readable media storing instructions that, when executed by a computing platform comprising at least one processor, a communication interface, and memory, cause the computing platform to:
  detect new activity data from a remote user account at a remote computing device, wherein detecting the new activity data includes detecting an idle state at the remote computing device prior to detecting the new activity data and after receiving data associated with a series of activities authorized by the remote computing device accessing a virtual desktop;
  evaluate the new activity data relative to data associated with the series of activities authorized by the remote computing device accessing the remote user account to identify a change in content access categorization;
  determine if the new activity data is indicative of a potential cyber-attack based on evaluating the new activity data relative to the series of activities and based on identifying the change in the content access categorization; and
  in response to determining that the new activity data is indicative of the potential cyber-attack, initiate one or more security response actions.

* * * * *